United States Patent
Abele et al.

(10) Patent No.: US 9,826,203 B2
(45) Date of Patent: Nov. 21, 2017

(54) METHOD AND SYSTEM FOR CONTROLLING A LASER-BASED LIGHTING SYSTEM

(71) Applicant: Intel Corporation, Santa Clara, CA (US)

(72) Inventors: Nicolas Abele, Demoret (CH); Michel Combes, Hyeres (FR)

(73) Assignee: INTEL CORPORATION, Santa Clara, CA (US)

( * ) Notice: Subject to any disclaimer, the term of this patent is extended or adjusted under 35 U.S.C. 154(b) by 552 days.

(21) Appl. No.: 14/480,580

(22) Filed: Sep. 8, 2014

(65) Prior Publication Data

US 2016/0073000 A1  Mar. 10, 2016

(51) Int. Cl.
  *H04N 7/18* (2006.01)
  *H04N 9/31* (2006.01)
  *F21S 8/10* (2006.01)

(52) U.S. Cl.
  CPC ............ *H04N 9/31* (2013.01); *F21S 48/1145* (2013.01); *F21S 48/1394* (2013.01); *F21S 48/1757* (2013.01)

(58) Field of Classification Search
  CPC .... H04N 9/31; F21S 48/1757; F21S 48/1394; F21S 48/1145
  USPC ........................................................ 348/148
  See application file for complete search history.

(56) References Cited

U.S. PATENT DOCUMENTS

2007/0172113 A1  7/2007  Sai et al.
2007/0229443 A1  10/2007  Sawada et al.
2008/0218501 A1  9/2008  Diamond
2009/0027399 A1  1/2009  Sato et al.
2011/0032357 A1  2/2011  Kitaura et al.
2013/0335531 A1*  12/2013  Lee ......................... G01B 11/25
                                                                348/46

(Continued)

FOREIGN PATENT DOCUMENTS

WO  2013/029667 A1  3/2013

OTHER PUBLICATIONS

International Search Report and Written Opinion received for PCT Patent Application No. PCT/US2015/048834, dated Dec. 22, 2015, 9 pages.

*Primary Examiner* — Allen Wong

(57) ABSTRACT

The present invention concerns a method for controlling a laser-based lighting system comprising a scanning mirror arrangement, arranged to be rotatable around two substantially orthogonal axes. The method comprises: (a) a sensor capturing a first image; (b) the sensor sending data representing at least part of the first image to an image generation unit; (c) the image generation unit generating a second image based on the data representing at least part of the first image, wherein the generated second image comprises information representing a feature region in the first image; (d) the image generation unit sending the second image to a projection system controller; and (e) the projection system controller, based on the received second image, controlling the operation of a projection system comprising a laser light source; and a scanning mirror arrangement for receiving the light radiated by the laser light source, and for reflecting the received light to a wavelength conversion element to project the second image. In the method the second image is streamed to the projection controller as an image pixel stream without first saving it in a memory.

20 Claims, 3 Drawing Sheets

(56) References Cited

U.S. PATENT DOCUMENTS

2014/0029282 A1   1/2014   Ravier et al.
2014/0293245 A1*  10/2014  Tani .................. G03B 21/2053
                                              353/85

* cited by examiner

METHOD AND SYSTEM FOR CONTROLLING A LASER-BASED LIGHTING SYSTEM

TECHNICAL FIELD

The invention relates to the field of lighting systems to be used for instance in automotive headlights or camera flashes. More specifically, the present invention relates to laser-based illumination systems comprising at least one scanning mirror arrangement. The invention also relates to a corresponding illumination method and to a computer program product.

BACKGROUND OF THE INVENTION

Scanning mirror based light projection systems are known in the field of illumination systems. WO2013/029667 and US2014/0029282 disclose examples of such systems, where the light source is a laser type light source. The advantage of using a laser light source is or example that laser-based illumination systems can generate very pure white light. A scanning mirror rotatable around two orthogonal axes is actuated and receives a light signal from a primary light source to project an image on to a phosphorous element. The light radiated by the primary light source, or more specifically its luminous intensity, for example, can be modulated to project a desired image on to the phosphorous element. The phosphorous element is then arranged to perform a wavelength conversion of the light signal received from the primary light source. Consequently the phosphorous element, acting as a secondary light source, re-emits light, which when combined with the light from the primary light source produce useful white light in different directions. In this kind of system a very high overall energy efficiency can be obtained as the wavelength conversion done by the phosphorous element is more energy efficient than the electrical-to-optical conversion done by the laser light source. Instead of using one scanning mirror rotatable around two orthogonal axes, it possible to use two mirrors instead, each movable around one axis, where the two axes are mutually orthogonal. This kind of lighting system can be used for example in vehicle headlights.

It is, however, difficult to efficiently control the above described illumination system to truly provide a smart illumination system, which could for instance, when applied to vehicle headlights, adapt the illumination to take into account current road conditions. For instance, the solution disclosed in US2014/0029282 does not provide sufficient control of the illumination system to be considered a truly smart illumination system. For instance, the illumination beam is not capable of moving horizontally or vertically. Furthermore, generally in headlights, three different light bulbs are needed: one for low beam, one for full beam and one for the indicator. Typically, each of these light bulbs is controlled by its own motor. However, this is not an optimal solution in terms of use of space and energy consumption. Moreover, the currently available image projection systems need at least one image frame or line buffer to temporarily store the images and possibly modify it before it is projected. Such a buffer is needed in the current solutions at least in the graphics processing unit (GPU) connected to a projector, but often also the projector comprises a similar buffer. Reading data from the buffer consumes energy and also means that the projected image cannot be modified in real-time.

SUMMARY OF THE INVENTION

It is an object of the present invention to overcome the problems identified above related to the laser based illumination solutions.

According to a first aspect of the invention, there is provided a method of controlling a laser-based lighting system comprising a scanning mirror arrangement, arranged to be rotatable around two substantially orthogonal axes, the method comprising:
  a sensor capturing a first image;
  the sensor sending data representing at least part of the first image to an image generation unit;
  the image generation unit generating a second image based on the data, wherein the generated second image comprises information representing at least one feature region in the first image;
  the image generation unit sending the second image to a projection system controller; and
  the projection system controller, based on the received second image, controlling the operation of a projection system comprising a laser light source; and the scanning mirror arrangement for receiving the light radiated by the laser light source, and for reflecting the received light to a wavelength conversion element to project the second image,
wherein sending the second image to the projection system controller comprises streaming the second image to the projection controller as an image pixel stream.

The proposed solution provides a smart illumination method according to which there is no need to save the projected image in a memory before it is projected. Thus, any modifications in the image to be projected may be carried out substantially in real time. Furthermore, the projection system can start projecting the image even before the whole image pixel stream has been received by the projection system controller. The proposed solution also offers a seamless cooperation of the elements involved in the method allowing the image captured by the sensor to affect the actual projected image.

According to a variant of the first aspect, the method comprises providing a default projection image, and masking the default projection image using the information representing the feature region in the first image.

According to another variant of the first aspect, the operation of the laser light source is controlled by adjusting the pixel brightness of the pixels of the image currently being projected to match the pixel brightness of the second image.

According to another variant of the first aspect, the pixels outside the feature region have a higher brightness value than the pixels inside the shape.

According to another variant of the first aspect, all the pixels outside the feature region have the same brightness value.

According to another variant of the first aspect, at least some of the pixels inside the feature region have different brightness values from each other.

According to another variant of the first aspect, the pixel brightness is adjusted by adjusting the input current of the laser light source.

According to another variant of the first aspect, controlling the operation of the projection system comprises applying an offset signal to an actuation signal of the scanning mirror arrangement.

According to another variant of the first aspect, controlling the operation of a projection system comprises adjusting the amplitude of oscillations of at least one mirror of the scanning mirror arrangement.

According to another variant of the first aspect, sending data representing at least part of the first image comprises streaming the data to the image generation unit.

According to another variant of the first aspect, the sensor defines the feature region before sending the data comprising information representing the feature region to the image generation unit.

According to another variant of the first aspect, information defining the location of the feature region within the first image is sent to the image generation unit.

According to another variant of the first aspect, all the pixels defining the first image are sent and where the feature region is defined by certain pixel values.

According to another variant of the first aspect, one light pulse from the laser light source represents one image colour.

According to another variant of the first aspect, the information representing the feature region comprises one or more mathematical equations.

According to another variant of the first aspect, the projection system controller when controlling the operation of the projection system takes into account parameter values detected by a parameter detector.

According to another variant of the first aspect, the parameter values comprise at least one of the following: speed of movement of the lighting system; angle of turning of the lighting system; inclination of the lighting system; and ambient level of light.

According to another variant of the first aspect, the second image is streamed without first saving it in an intermediate storage.

According to a second aspect of the invention, there is provided a computer program product comprising instructions for implementing the steps of the method according to the first aspect when loaded and run on computer means of a laser-based lighting system.

According to a third aspect of the invention, there is provided a laser based lighting system comprising:
  a sensor for capturing a first image and for sending data representing at least part of the first image to an image generation unit;
  the image generation unit for generating a second image based on the data, wherein the generated second image comprises information representing at least one feature region in the first image; and for sending the second image to a projection system controller;
  the projection system controller for controlling, based on the received second image, the operation of a projection system;
  the projection system for projecting the second image, the projection system comprising a laser light source; and a scanning mirror arrangement for receiving the light radiated by the laser light source, and for reflecting the received light to a wavelength conversion element; and
  the wavelength conversion element for projecting the second image,
  wherein the image generation unit is arranged to stream the second image to the projection controller as an image pixel stream.

Other aspects of the invention are recited in the dependent claims.

BRIEF DESCRIPTION OF THE DRAWINGS

Other features and advantages of the invention will become apparent from the following description of a non-limiting exemplary embodiment, with reference to the appended drawings, in which.

DETAILED DESCRIPTION OF AN EMBODIMENT OF THE INVENTION

Figure 1:
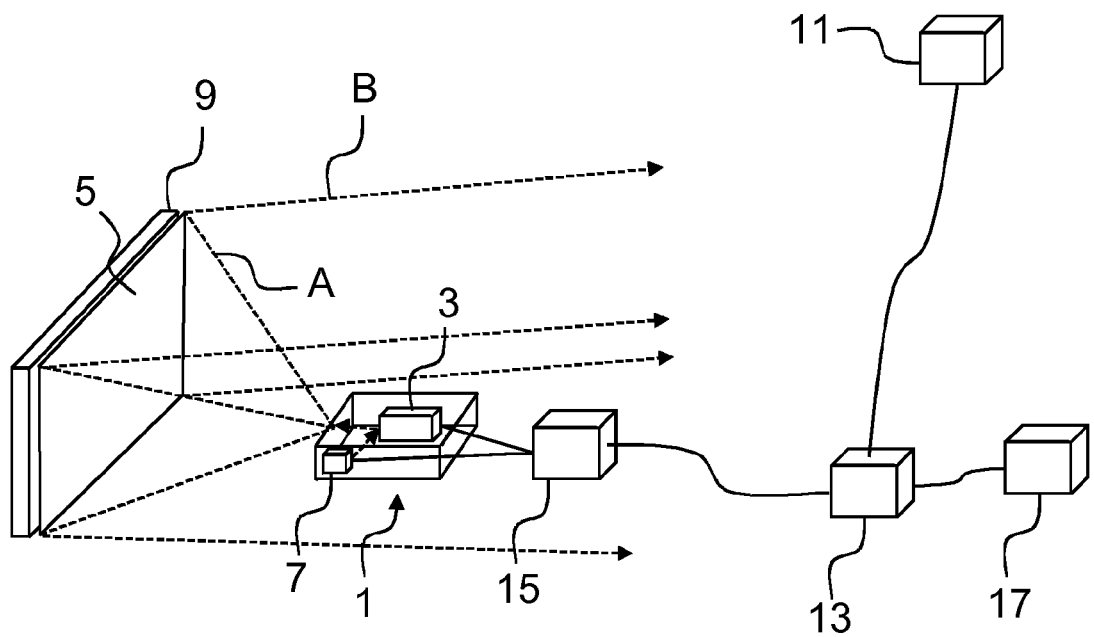
FIG. 1 is a simplified block diagram showing an exemplary lighting arrangement according to one aspect of the present invention.

An embodiment of the present invention will now be described in detail with reference to the attached figures. Identical or corresponding functional and structural elements which appear in the different drawings are assigned the same reference numerals. The teachings of the invention are explained in detail in the context of an automotive application, but the invention is by no means limited to this environment.

FIG. 1 is a schematic block diagram illustrating an exemplary lighting system according to an embodiment of the present invention. This arrangement may be used for example in the headlights of a vehicle, such as a car, or in photographic flash applications. In FIG. 1 there is shown a projection system 1, or simply a projector, which in this example is a MEMS (Micro-Electro-Mechanical System) scanning mirror-based projection system. This projection system 1 comprises a scanning system 3, which in this example has one mirror arranged to be rotated around two orthogonal axes. However, the scanning system could alternatively have two mirrors, each arranged to be tilted around one of the two orthogonal axes. The scanning mirror may be actuated using magnetic, electrostatic, thermal, piezo-electric, hydraulic, pneumatic, chemical or acoustic means. This kind of optical scanning system is sometimes called a "scanner". The advantage of a scanning system is that a real image can be projected on to a wavelength conversion element 5, allowing the brightness of the image to be locally controlled so that, as explained later, the resulting projected and reflected light beam can have local brightness adjustments to avoid temporarily dazzling or blinding drivers of oncoming vehicles when the lighting system is used in a vehicle headlight.

Figure 2:
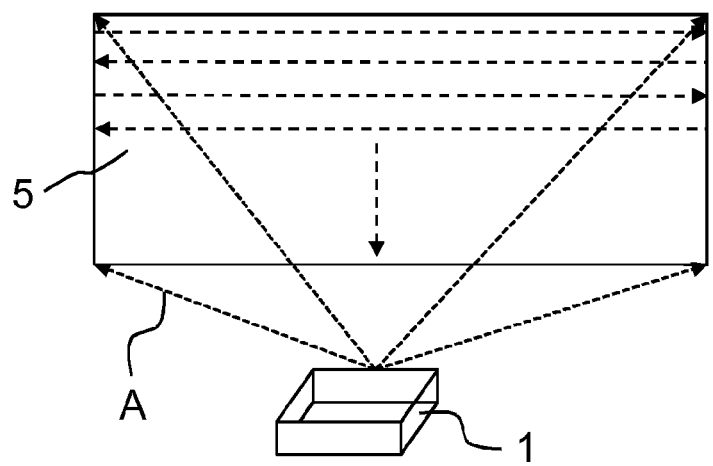
FIG. 2 illustrates schematically how to project an image on to a wavelength conversion element according to one example.

The projection system 1 also includes a light source 7, and more specifically a laser light source which is arranged to emit light at one wavelength. In this particular example the light emitted is an ultraviolet (UV) or near-UV light having wavelength of 360 nm to 480 nm. However, other types of laser could be used, from UV light to visible light and infra-red light. The light source 7 is arranged to emit light on to the scanning system 3. The laser beam generated by the light source is thus deviated in two orthogonal planes by the scanning system and it emerges in a solid angle projecting on to all or part of the surface of the wavelength conversion element 5, such as, for example, a phosphor plate or a plate on which preferably a continuous and homogeneous layer of phosphor has been deposited. Each point on the phosphor plate of the wavelength conversion element 5 receiving the laser beam A from the scanning system, typically monochromatic and coherent, absorbs the laser power and then re-emits a light B of a different wavelength. The resulting combined light can be considered as "white", since it contains a plurality of wavelengths between about 400 nm and 800 nm, i.e. in the visible light spectrum. It is to be noted that the projection system can also be used in night-vision applications. The scanning system 3 is arranged to deflect the laser light following various kinds of pattern, such as a Lissajous pattern or a raster pattern (interlaced or non-interlaced). FIG. 2 illustrates a typical raster pattern projection, where the light is deflected so that lines are scanned from left to right and then from right to left, from top to bottom or vice-versa. Within the raster pattern projection, the image can also be displayed during the so-called fly-back scanning pattern (in a typical raster scan display, the MEMS mirror displays the image only in one sweep of the mirror controlling the refresh rate, however in the fly-back option, the same or another pattern may be displayed on the other sweep of the mirror) or other patterns could be used, where the direction of the pattern can be switched (vertical scanning instead of horizontal scanning, therefore where the image is scanned to display vertical lines and to display all the lines from left to right or vice-versa), or where the screen is scanned using any kind of space filling curve, for example Peano, Hilbert, or other fractal or L-system curves.

A reflector element 9 may be placed behind the wavelength conversion element 5 and may have substantially the same surface area as the wavelength conversion element 5. The reflector element may be a plate which is substantially parallel to the wavelength conversion element 5. The distance between the wavelength conversion element 5 and the reflector element 9 may be between 0 cm to 15 cm for example. In other words, the wavelength conversion element may be in direct contact with the reflector element 5. The size of the reflector element may be between 0.1 cm×0.1 cm and 20 cm×20 cm for example. The size may be for example from 0.1 cm×0.1 cm to 5 cm×5 cm for photographic flash applications and from 1 cm×1 cm to 20 cm×20 cm for headlamp applications. The reflector element is arranged to reflect light emitted mainly by the wavelength conversion element 5 in a desired direction. By locating the reflector at the rear side of the wavelength conversion element 5 no light, or only very little light, reaches a rear part of a housing, opposite to where the projection system 1 is located as shown in FIG. 1. Alternatively, instead of using a flat mirror reflector, the reflector may be curved so that the reflected light is shaped by this reflector. For example, if the mirror has a concave curvature, the reflected light will be more concentrated, in other words the maximum distance between all the reflected beams B will be smaller than with a flat reflector. Alternatively, the reflector can also be a prismatic tape such as DOT C tapes or has a tetrahedral or octahedral structure to make it retro-reflective. It is also possible to use a reflective array comprising micro-focal elements as the reflector. The micro-focal elements may be microlenses or micro-mirrors, also referred to as micro-reflectors, whose largest dimension (e.g. diameter) may be in the range 1 μm to 5000 μm, for example, or more particularly in the range 50 μm to 1000 μm. Thus, if each of the lenses in the array is touching its neighbours, the array pitch is also in the range 1 μm to 5000 μm, for example, or more particularly in the range 50 μm to 1000 μm. The reflecting angle, also called a diffusing angle, of these microfocal elements is from a few degrees up to 180 degrees. It is to be noted that one array may comprise a mixture of different micro-focal elements, for instance a mixture of micro-focal elements of different sizes, shapes and/or focal lengths. In other words, the micro-focal elements in one array do not have to be of the same type.

The reflector element 9 in the illustrated example has an array of specifically shaped optical elements, so that the reflected light beam can be shaped more accurately than without these optical elements, and the use of the reflected or re-emitted light can be made more efficient, as it will be radiated directly in the right direction and with the desired beam profile. The reflector element 9 thus provides a beam shaping capability. For example, the reflected light from the reflector element 9 may be shaped to exit the headlight directly without first being reflected from the surface of the housing. Indeed, any internal reflection from the surface of the housing incurs a light loss because that surface typically only has a reflectivity of 85%, and thus represents a light loss of 15%. It is also to be noted that, thanks to the lens array, there is no need for any supplementary optical imaging systems in the lighting arrangement to direct the light beams in a desired direction.

The lighting arrangement in FIG. 1 further comprises a sensor unit 11 which in this example is a camera or an ambient light sensor. In case of an ambient light sensor, the sensor unit 11 can be arranged to detect current light conditions of the lighting arrangement. In case of a camera, the sensor unit 11 is arranged to detect objects and/or current environmental conditions of the lighting arrangement. For instance, when applied to a vehicle, the camera is arranged to detect the current road or driving conditions. For example, it may detect oncoming vehicles. It may also detect road signs, markings, traffic lights etc. In this example the camera is connected to an image/video generation unit 13, also called a GPU, which is arranged to generate an image of which purpose will be explained later. This image, or more specifically a signal representing this image, is in this example arranged to be sent to a projector system controller 15 via a communication link. In the figure there is also shown a parameter detector 17, which in this example is a driving parameter detector 17, which is arranged to detect at least some current driving related parameters. For example, it may detect whether the vehicle is turning and if so in which direction, or whether the vehicle is going downhill or uphill. Thus, the driving parameter detector may have a sensor connected to it, or the sensor may be part of the driving parameter detector 17. In this example, the driving parameter detector 17 is connected to the GPU 13. There may be one or more of each of the elements 11, 13, 15 and 17 per vehicle.

The projector system controller 15 is arranged to control, i.e. determine the behaviour of the operation of the projection system 1. More specifically, it is configured to control the operation of the laser light source 7 and the scanning system 3. The laser light source 7 can be controlled by adjusting the current that flows to laser diodes. In this way the brightness of the light beam emitted by the laser source can be adjusted. The brightness may also be referred to as a luminous intensity, in other words it is the perceived light power per unit solid angle. Thus, by varying the laser light output modulation, a part of the image can be illuminated on the wavelength conversion element 5, while another part may not be illuminated.

Figure 3:
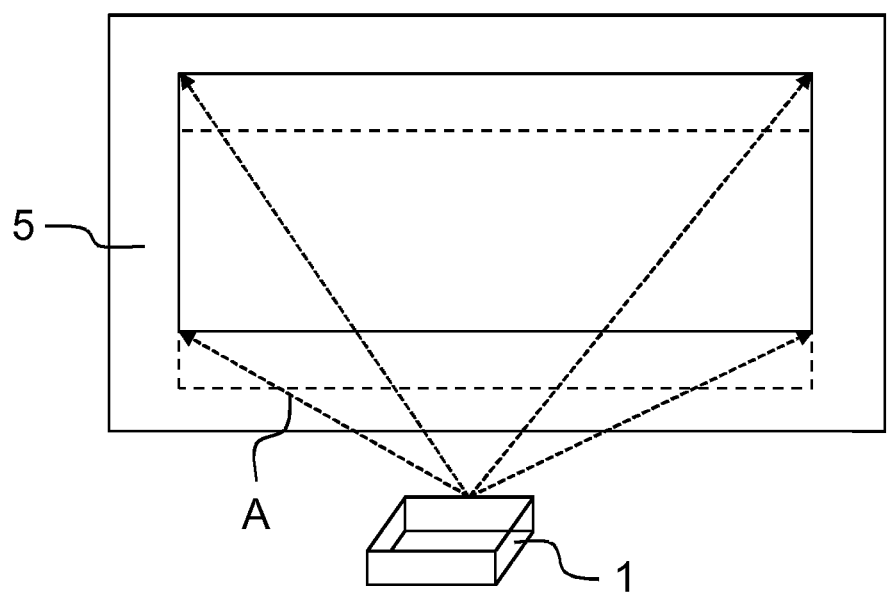
FIG. 3 illustrates schematically how to move a projected image vertically on a wavelength conversion element.

The entire projected image can be offset by applying an offset signal on top of an actuation signal of the scanning system. If this offset signal is applied to the mirror that generates the vertical component of the projected image, then the image can be shifted vertically as illustrated in FIG. 3, where the dashed lines represent the old image and the solid lines represent the currently projected image. If, on the other hand, the offset signal is applied to the mirror that generates the horizontal component of the image, then the image can be shifted horizontally. In this manner, for instance, it is possible to avoid dazzling or temporarily blinding the drivers of oncoming vehicles. The actuation signal may be at a different frequency than the fundamental resonance frequency of the mirror. In this manner the mirror or mirrors move(s) according to a linear motion instead of a sinusoidal motion. This is then providing a so-called "static" movement of the mirror.

By adjusting the amplitude of oscillations of the scanning mirror, it is possible to vary the size of the projected image. This is achieved by adjusting the amplitude of the actuation signal of the scanning system 3. For instance, reducing the amplitude of oscillation of the mirror generating the horizontal component of the image will reduce the horizontal distance on the wavelength conversion element 5 over which the light is scanned. Reducing the amplitude of oscillations of the mirror generating the vertical component of the image will reduce the vertical distance on the wavelength conversion element 5 over which the light is scanned. Thus, the whole of the image is now projected over a smaller portion of the display area 2 than without this adjustment. Thus, the whole image 3 will appear smaller than its original size. In a corresponding manner, the image size can be increased by increasing the amplitude of the oscillations. This technique may be used to increase or decrease the brightness of the resulting light beam as the light will be more or less concentrated.

Thus, by controlling the operation of the projector system 1 by the projector system controller 15 based on the information received from the driving parameter detector 17 and/or from the sensor 11, an illumination pattern which changes based on the environmental conditions and/or driving parameters is obtained in front of the vehicle. If the operation of the scanning system 3 is controlled and if it is electrostatically, piezo-electrically or thermally actuated, then the controlling may be carried out by varying the voltage applied to the scanning system. However, if the scanning system 3 is actuated magnetically, then controlling may be carried out by varying the current or voltage applied to the scanning system. It is to be noted that the control methods described above can be combined so that the effects take place simultaneously.

Figure 4:
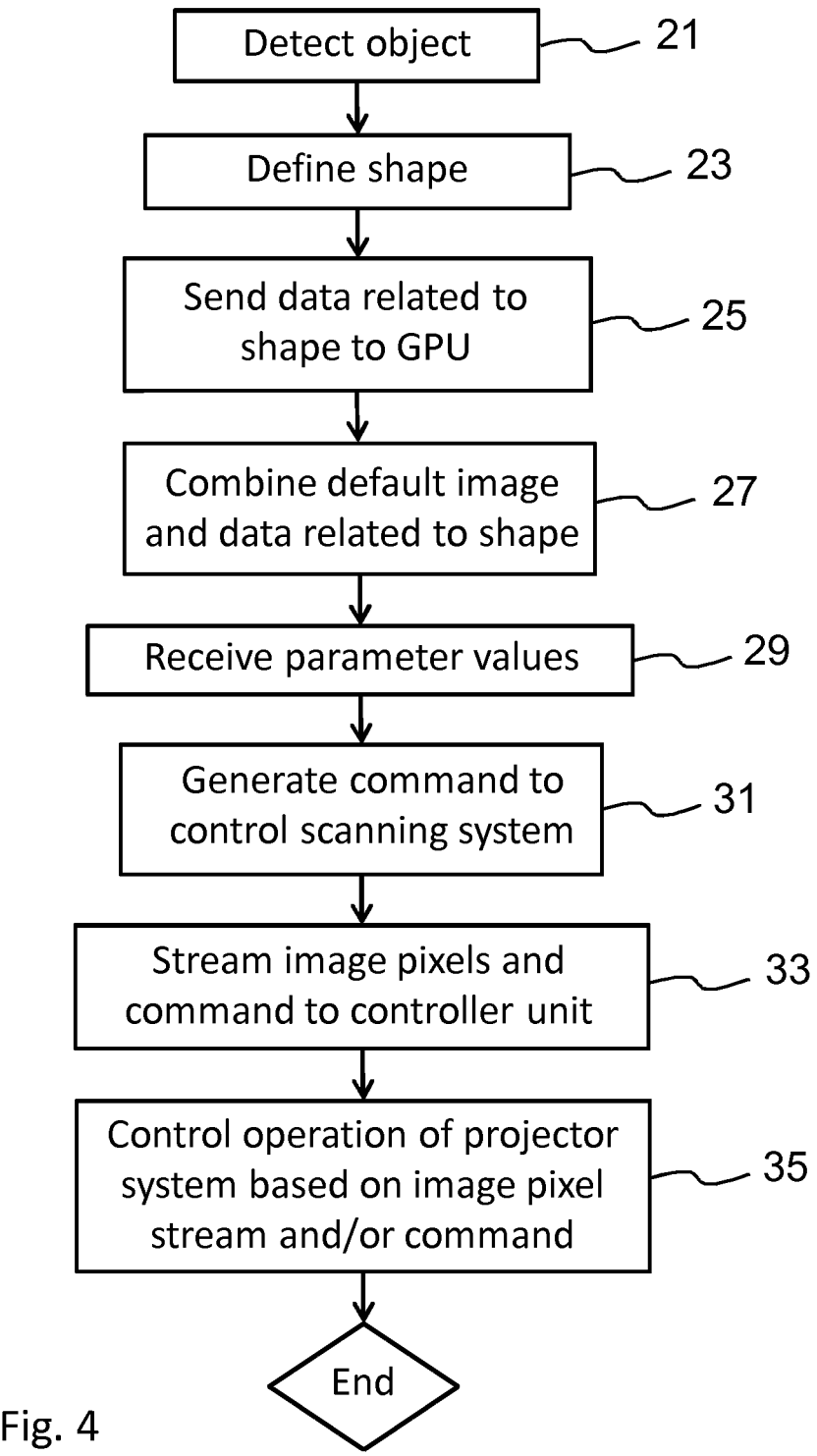
FIG. 4 is a flow diagram illustrating an exemplary method of controlling the operation of a lighting system.

An illumination method according to an example of the present invention is now explained more in detail with reference to the flow chart of FIG. 4. In step 21 the sensor detects an object or captures a first image. This object may be for instance a windshield of an oncoming vehicle, a rear windshield of a vehicle in front, or in photography applications the object may be the head of a person to be photographed. For instance, detecting a windshield from a car chassis is quite easy due to the difference in the light reflection (for example illuminated by the headlamps). Thus, little computing power is required, and the shape of the windshield is also a simple trapezoidal shape, which can be defined by a simple equation. Another example of a simple equation is a circle defined mathematically with the following equation: $(x-a)^2+(y-b)^2=r^2$, where a and b define the position of the circle centre along x and y axes, respectively, and r is the radius of the circle. This circle may advantageously cover the detected object, which may be a vehicle or part of it or a person's head. The shape, also referred to as feature region, defined in this manner may not be illuminated or the pixel values inside the shape should at least have a low brightness value. One way to define the radius is to get the distance from the object from the sensor 11 and/or the driving parameter detector 17. It is to be noted that the sensor 11 may also determine the distance to the object by triangulation. For a random shape, the equation may be a set of equations or line segments, in which case the area enclosed in by the segments defines the resulting shape.

Based on the detected object or the captured image (first image), in step 23 the sensor 11 defines a shape or pattern such as a polygonal shape, whose size and shape correspond to the size and shape of the detected object (e.g. car windshield). The size of the shape may be scaled with respect to the size of the detected object by using a given conversion table, for example to take into account the distance to the object. This shape will be visible in the image (second image) which will be projected on to the wavelength conversion element 5 as explained later in more detail. In step 25 some data representing the shape is sent to the GPU. In this example, the data is streamed as a data stream. According to a first option, the sensor 11 provides only the data stream related to the location of the shape within the image to be projected. For example, the following information may be streamed to the GPU 13: line 0, pixels 0 to 25; line 1, pixels 2 to 20 etc. Here the line numbers refer to the order of the pixel line numbers in the image to be projected. According to a second option, the sensor 11 provides a complete first image pixel stream to the GPU 13. According to this option, also the pixel values are provided, or more specifically the pixel brightness values. If a value deviates from a predetermined value, then it can be determined that these pixels are outside the shape. In this way the GPU 13 can determine the exact location of the shape in the image to be projected. For instance, the following pixel stream may be sent to the GPU 13: line 0, pixel 0, pixel value=0; line 0, pixel 1, pixel value=0; line 0, pixel 2, pixel value=0; line 0, pixel 3, pixel value=1; line 0, pixel 4, pixel value=1; . . . ; line 10, pixel 4, pixel value=255 etc. In this example the pixel value 255 is the maximum value and thus it can be determined that this pixel is outside the shape, whereas pixels having a pixel value different from this value are part of the shape. Above a raster image was assumed, but vector or other images may also be used with suitable amendments. Indeed, the pixels outside the shape all have the same pixel value, which may be the value representing the maximum pixel brightness. The pixels which are inside the shape may have different pixel values from each other. It is also possible that the sensor 11 sends a data stream of the first image to the GPU 13 without defining any shapes in the stream. In this case the GPU 13 would extract one or more shapes from that stream and combine those shapes with a default image (third image). Typically the first, second and third images are all different from each other and, as explained below, the second image is obtained from the first and third images by combination.

Once the GPU 13 has received the data stream from the sensor 11, then this data stream is combined with the pixels of the default image. This may be done by masking the default projection image using the information representing the shape in the first image. This may be done by deducting pixel by pixel the data stream from the pixels of the default image, which is generally larger than the first image in terms of number of pixels. In other words, the pixels corresponding to the shape in the data stream replace the corresponding pixels in the default image. The default image may for instance be a white image with all the pixels having a maximum brightness. In addition to that, if the first option above is used, then the GPU 13 defines the pixel values inside the shape. By default, the pixel values inside the shape may have brightness values set to zero. Alternatively, the pixel values may be defined based on further information received from the sensor 11 and/or based on information received from the driving parameter detector 17. It is to be noted that it is possible that the first image size is different from the third image size. If the second option above is used, then at least the pixel values inside the shape have already been defined.

In step 29 the GPU 13 may receive some driving related parameters, such as the position of the driving wheel, speed of travel of the vehicle, inclination of the vehicle etc from the driving parameter detector 17. Some of these parameters may be obtained by a satellite positioning system connected to the driving parameter detector 17. It is also possible that a button or other control input is operated manually by a driver for example to send a signal to the driving parameter detector 17 to adjust the height of the headlights. In step 31 the GPU converts the received driving related parameters to a command to change the default image size and/or to move it horizontally and/or vertically. Of course, this conversion could be done by the projector system controller 15 instead. In step 33 the GPU streams the image pixel stream to the projector system controller unit 15 if necessary together with the manual command mentioned above, or the command may be sent to the projector system controller 15 separately. In this manner, there is no need to have an image buffer in the GPU 13 or in the projector system controller 15 for caching or saving the second image. By not having to store and/or read the image from a memory has, the present imaging method can operate faster than previous solutions and, according to this invention, the image pixels can be modified and projected substantially in real time. Accordingly, by sending a signal to directly control the current applied to the mirror system and/or to the laser diodes of the light source 7, the response time to any desired modifications in the image can be optimised. The image pixel stream speed may be adapted based on the speed of the vehicle (obtained from the driving parameter detector 17), so as to send the pixel information to the projector system controller 15 at the right speed, so that the resulting generated second image to be projected takes the speed of the vehicle into account.

In step 35 the projector system controller 15 transforms digital information, i.e. the second image pixel stream and/or the command, from the GPU into current and/or voltage output which is sent to the scanning system 3 and/or to the laser diodes. In this manner the operation of the projection system 1 can be controlled substantially in real time, and the projected image takes into account, substantially in real time, any changes detected by the sensor 11.

According to the teachings above, various kinds of images which take into account the varying external conditions may be projected on to the wavelength conversion element 5 to be further reflected towards the front of the imaging system. The projected image may take various forms. For example an arrow may be displayed on a road to show a driver the direction where to go. This arrow may be displayed by projecting light all-around the arrow but leaving the arrow itself darker, i.e. less brightly illuminated. In this manner the driver obtains driving information, but can still see the road, because it remains illuminated. According to another example, the projected image could illuminate the road, but leave a dark or black line or region on one or both sides of the white line or marking on the road to increase the contrast between the road and the line or marking as perceived by the human eye. In this case the dark or black line may be essentially contiguous with the white line or marking on the road. According to a further example, the teachings above may be used in switching between left-hand and right-hand-drive cars. In the past, all manufacturers had to produce two different types of headlamp units for left-hand-drive and right-hand-drive countries. For example, in some left-hand-drive countries the authorities require right-hand-drive cars to be fitted with a beam-bender as a temporary measure (e.g. for tourists' cars), or changing the headlamps completely if the car is to be imported. A beam-bender is a kind of plastic Fresnel lens glued to the glass of the headlamp. With the present invention the changes can be simply done by changing the car's user preferences in software. According to a further example, the projector may be used in photographic flashes to illuminate the darker areas and then to correct accordingly the sensor returned values so as to provide a high dynamic range capture of the camera image sensor.

The above described embodiment can be varied in multiple ways. For instance, a power-safe mode can be used in the system so that if the sensor 11 and/or the driving parameter detector 17 do not detect any changes, no computing is done by the GPU 13 and the pixel output stream to the projector system controller 15 remains constant. If the teachings above are applied to photographic flash applications, the parameter detector may be an ambient light sensor. The information from this sensor may be used to adjust the pixel brightness values of the image to be projected. In this manner illumination of certain parts of the image or the whole image can be adjusted.

While the invention has been illustrated and described in detail in the drawings and foregoing description, such illustration and description are to be considered illustrative or exemplary and not restrictive, the invention being not limited to the disclosed embodiment. Other embodiments and variants are understood, and can be achieved by those skilled in the art when carrying out the claimed invention, based on a study of the drawings, the disclosure and the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:
1. A method, comprising:
capturing a first image;
sending data representing at least part of the first image to an image generation unit;
generating, at the image generation unit, a second image based on the data, wherein the generated second image comprises information representing at least one feature region in the first image;
streaming the second image to a controller for a projection system as an image pixel stream, the projection system comprising a laser light source, a scanning mirror apparatus, and a wavelength conversion element, the scanning mirror apparatus arranged to receive light radiated by the laser light source and rotate around two substantially orthogonal axes to reflect the received light to the wavelength conversion element to project the second image; and
projecting the second image via the projection system.
2. A method according to claim 1, comprising providing a default projection image, and masking the default projection image using the information representing the feature region in the first image.

3. A method according to claim 1, comprising adjusting the pixel brightness of the pixels of the image currently being projected to match the pixel brightness of the second image.

4. A method according to claim 3, wherein the pixels outside the feature region have a higher brightness value than the pixels inside the shape.

5. A method according to claim 3, wherein all the pixels outside the feature region have the same brightness value.

6. A method according to claim 3, wherein at least some of the pixels inside the feature region have different brightness values from each other.

7. A method according to claim 3, comprising adjusting the input current of the laser light source.

8. A method according to claim 1, comprising applying an offset signal to an actuation signal of the scanning mirror apparatus.

9. A method according to claim 1, comprising adjusting the amplitude of oscillations of at least one mirror of the scanning mirror apparatus.

10. A method according to claim 1, wherein sending data representing at least part of the first image comprises streaming the data to the image generation unit.

11. A method according to claim 1, comprising defining the feature region before sending the data comprising information representing the feature region to the image generation unit.

12. A method according to claim 11, wherein information defining the location of the feature region within the first image is sent to the image generation unit.

13. A method according to claim 11, wherein all the pixels defining the first image are sent and where the feature region is defined by certain pixel values.

14. A method according to claim 1, wherein one light pulse from the laser light source represents one image color.

15. A method according to claim 1, wherein the information representing the feature region comprises one or more mathematical equations.

16. A method according to claim 1, wherein the projection system controller when controlling the operation of the projection system takes into account parameter values detected by a parameter detector.

17. A method according to claim 16, wherein the parameter values comprise at least one of the following: speed of movement of the lighting system; angle of turning of the lighting system; inclination of the lighting system; and ambient level of light.

18. A method according to claim 1, wherein the second image is streamed without first saving it in an intermediate storage.

19. A computer program product, comprising a non-transitory computer-readable medium having instructions stored thereon, the instructions, when executed by a controller for a laser based lighting system, implement the method of claim 1.

20. A laser based lighting system comprising:
a sensor for capturing a first image and for sending data representing at least part of the first image to an image generation unit;
the image generation unit for generating a second image based on the data, wherein the generated second image comprises information representing at least one feature region in the first image; and for sending the second image to a projection system controller;
the projection system controller for controlling, based on the received second image, the operation of a projection system;
the projection system for projecting the second image, the projection system comprising a laser light source; and a scanning mirror arrangement for receiving the light radiated by the laser light source, and for reflecting the received light to a wavelength conversion element; and
the wavelength conversion element for projecting the second image,
wherein the image generation unit is arranged to stream the second image to the projection controller as an image pixel stream.

* * * * *